United States Patent [19]

Tolaas

[11] E Re. 29,185

[45] Reissued Apr. 19, 1977

[54] WEDGE SHAPED CARTON

[75] Inventor: William M. Tolaas, St. Paul, Minn.

[73] Assignee: Hoerner Waldorf Corporation, St. Paul, Minn.

[22] Filed: July 19, 1976

[21] Appl. No.: 706,192

Related U.S. Patent Documents

Reissue of:

[64] Patent No.: 3,876,131
Issued: Apr. 8, 1975
Appl. No.: 375,599
Filed: July 2, 1973

[52] U.S. Cl. ..... 229/22; 206/491; 229/17 R; 426/113

[51] Int. Cl.[2] ..... B65D 5/18; B65D 85/00

[58] Field of Search ..... 229/22, 51 R, 51 AS, 229/51 TS, 51 D, 51 ST, 51 WB, DIG. 14, 17 R; 206/45.32, 45.31; 426/113, 119

[56] References Cited

UNITED STATES PATENTS

| | | | |
|---|---|---|---|
| 1,367,379 | 2/1921 | Gruenberg | 229/17 R |
| 1,595,687 | 8/1926 | Petersen | 229/17 R |
| 2,012,063 | 8/1935 | Unger | 229/22 |
| 2,358,923 | 9/1944 | Guyer | 229/17 R |
| 2,701,090 | 2/1955 | Buttery | 229/22 |
| 2,776,787 | 1/1957 | Nicol | 229/7 R |
| 3,142,430 | 7/1964 | Meyers | 229/22 |
| 3,335,846 | 8/1967 | Mills | 220/9 F |
| 3,623,650 | 11/1971 | Watts | 229/22 X |
| 3,672,916 | 6/1972 | Virnig | 426/113 |
| 3,771,713 | 11/1973 | Davidson | 229/27 |

*Primary Examiner*—Davis T. Moorhead
*Attorney, Agent, or Firm*—Jerry F. Best

[57] ABSTRACT

A carton is provided having opposite side portions which project beyond the lower surface of carton. The lower surface is provided with apertures so that heat may pass through the apertures when the carton is placed in an oven or other heating chamber. A strip of film is secured to the lower surface and along an adjoining wall. The film normally closes the apertures, but is removable to expose the apertures.

12 Claims, 14 Drawing Figures

WEDGE SHAPED CARTON

Matter enclosed in heavy brackets[ ]appears in the original patent but forms no part of this reissue specification; matter printed in italics indicates the additions made by reissue.

This invention relates to an improvement in a carton for use in containing items to be heated such as a wedge shaped piece of pizza pie or the like.

BACKGROUND OF THE INVENTION

Various cartons have been provided for containing products such as frozen pizza pie. For the most part, these cartons comprise a disc of paper board on which the frozen pizza pie is positioned, and the product is over wrapped with a plastic film which is marginally secured to the underside of the disc. Under normal circumstances, the circular pizza is removed from the package, and rested upon a flat sheet in an oven while in its frozen state. It has now been proposed to cut the circular pizza pie into wedge shaped segments and to insert these segments into a generally triangularly shaped carton which may be heated in a very short period of time in a microwave oven or the like. Such ovens are readily available, and are often used in places of business to heat frozen sandwiches and the like.

One of the problems involved lies in the fact that the carton containing the product must be vented so that the moisture vapor escaping from the product during the heating process can escape. At the same time, however, the product must be sealed within the carton during storage and shipment to prevent it from becoming contaminated.

SUMMARY OF THE INVENTION

It is the object of the present invention to provide a carton for containing one or more wedges of pizza pie or the like which is provided with openings permitting the circulation of air through the carton during the heating process, and which will be effectively sealed prior to its use. This is accomplished by providing apertures through the carton, preferably in the bottom panel and in adjoining end wall panel. These apertures are normally covered by a strip of plastic film to protect the product from contamination. When the product is used, the plastic film is removed, opening the various apertures in the carton and permitting the circulation of heated air through the carton during the heating process.

A further feature of the present invention lies in the provision of a carton of the type described in which certain of the carton walls extend below the bottom panel of the carton. As a result, the apertured bottom panel is held in a slightly elevated position when the carton is rested upon a metal panel in the oven so that the apertures are not closed by the supporting panel.

A further feature of the present invention resides in the provision of a carton having a wall panel which is defined by weakened lines of separation which permit the panel to be removed for the dispensing of the product. After the product has been heated, it is only necessary to remove this panel and to slide the product from the carton in which it has been heated.

In view of the fact that the carton is of triangular form, and in view of the further fact that it is difficult to shape the plastic film, two corners of the film normally overlap the side walls of the carton. It is necessary to secure these corners to the side walls so that the corners of the film will fold with the side walls during the formation of the carton. In order that these corners may not be held tightly between the inner and outer side walls, the portions of the side walls to which the film is attached are preferably embossed so that the film may be released to permit the film to be removed before the heating process is started.

These and other objects and novel features of the present invention will be more fully and clearly sent forth in the following specification and claims.

Figure 1:
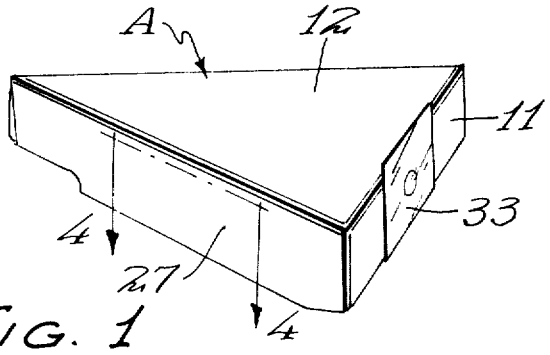
FIG. 1 is a perspective view of a carton, showing my construction.
Figure 4:
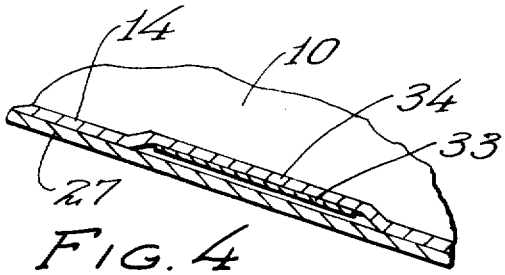
FIG. 4 is a sectional view, the position of the section being indicated by the line 4—4 of FIG. 1.

The carton illustrated in its blank form and identified by the letter A. The carton includes a triangular bottom panel 10, an end wall panel 11 of rectangular shape, and a top wall panel 12 which is triangular and is of similar size and shape to the bottom panel 10.

Inner side wall panels 13 and 14 are connected to the converging side edges of the triangular bottom panel 10 along fold lines 15 and 16. A corner flap 17 is hingedly connected to one side wall such as 13 along a fold line 19. The flap 17, in the erected form of the carton, lies against the inner surface of the side wall 14 and may or not be adhered thereto.

Corner flaps 20 and 21 are connected to the ends of the end wall 11 along perforated lines 22 and 23 respectively. The fold line 24 which connects the end wall 11 to the bottm panel 10 is also preferably a weakened line of separation, as is also the fold line 25 connecting the end wall 11 to the top panel 12. The corner flaps 20 and 21 are designed to overlap the side walls 13 and 14 respectively and may be anchored thereto if it is so desired. The top wall panel 12 is connected to outer side wall panels 26 and 27 along converging fold lines 29 and 30 respectively. In the preferred form of construction, the side walls 26 and 27 are somewhat wider than the side walls 13 and 14, and accordingly extend somewhat below the level of the bottom panel 10. The purpose of this arrangement is to permit the bottom panel 10 to be supported somewhat above the level of a surface on which the carton is placed. In other words, when the carton is closed, the bottom panel is held somewhat above the level of the supporting surface so that air may circulate through the carton when the product is being heated.

Figure 2:
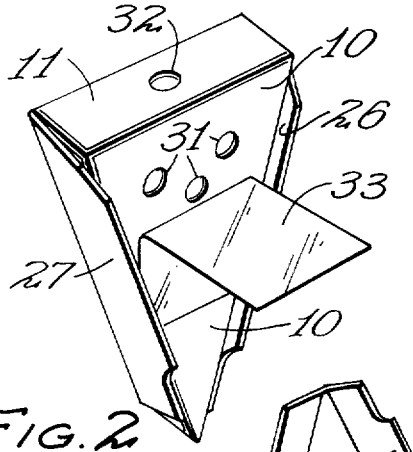
FIG. 2 is a perspective view of the carton in partially opened position.
Figure 5:
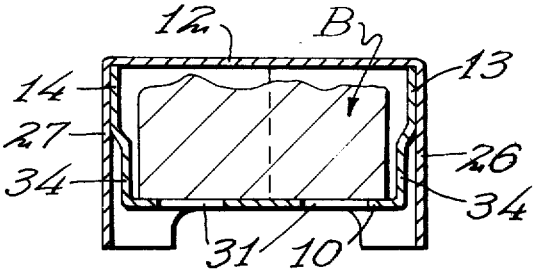
FIG. 5 is a sectional view of the carton after the sealing strip has been removed.
Figure 6:
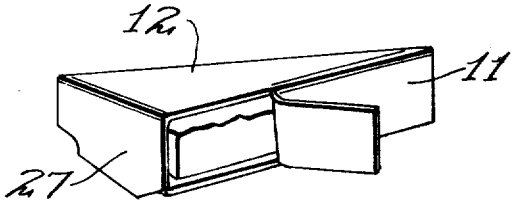
FIG. 6 is a perspective view of the carton with the end wall partially removed for removal of the contents.
Figure 3:
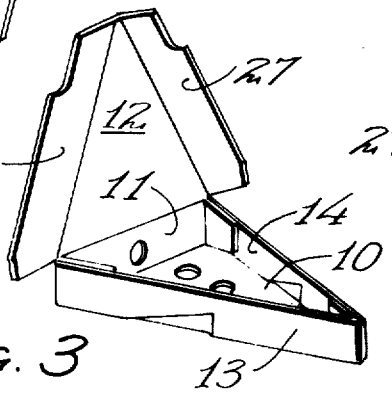
FIG. 3 is a perspective view of the carton before it is closed.
Figure 7:
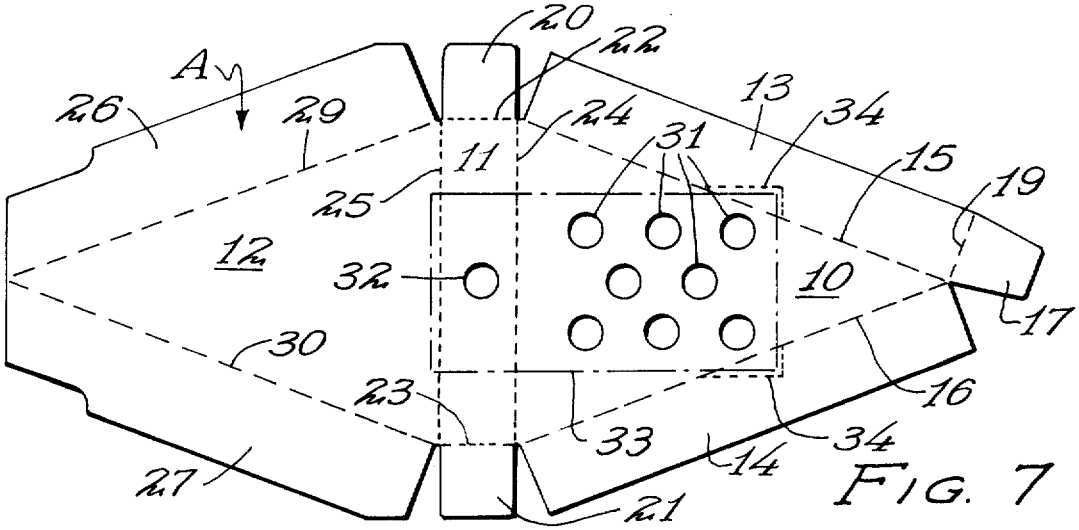
FIG. 7 is a diagrammatic view of the carton blank from which the carton is formed.
Figure 8:
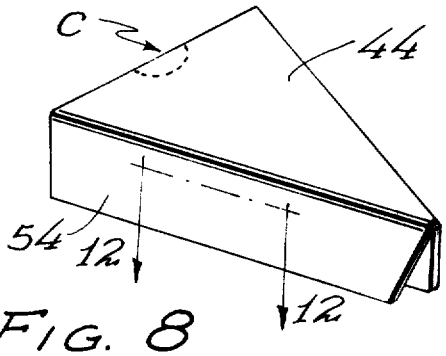
FIG. 8 is a perspective view of a modified form of carton.
Figure 9:
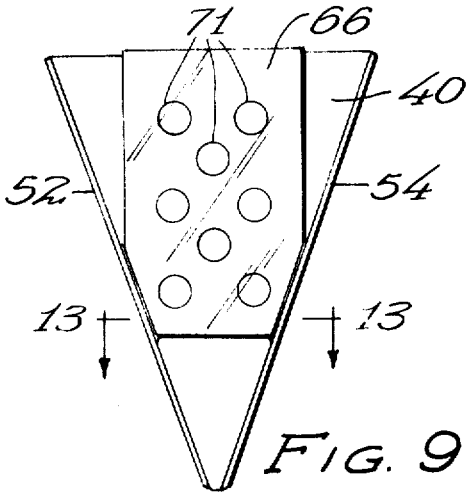
FIG. 9 is a bottom plan view of the carton shown in FIG. 8.
Figure 12:
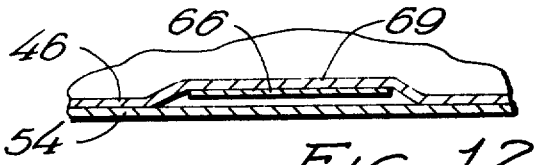
FIG. 12 is a sectional view through a portion of the carton, the position of the section being indicated by the line 12—12 of FIG. 8.

The bottom panel 10 is provided with a series of apertures 31 extending there through, and another aperture such as 32 is normally provided in the end wall 11. These apertures 31 and 32 normally closed by a strip 33 of plastic film or the like which is marginally secured to the bottom panel and to the end wall panel 11. Thus during storage and shipment, the various holes through the carton are closed to prevent any possibility of contamination of the carton contents. The carton contents is indicated in general by the letter B and indicated in FIG. 5 of the drawings. In forming the carton A, the strip of film 33 is applied to the outer surface of the carton A and is secured in such a manner that it may be readily removed therefrom. As indicated in FIG. 1 of the drawings, the film 33 extends slightly above the level of the top panel 12 so that the end of the film may be grasped and pulled free. In view of the fact that the plastic film does not adhere with great tenacity to the paper board, the film will become rather readily removed in the manner indicated in FIG. 2 of the drawings. In order that the corners of the film 33 may be readily removed, generally triangular areas 34 of the side walls 13 and 14 are embossed so as to provide a sufficient space between the inner side walls 13 and 14, and the outer side walls 26 and 27, so that the corners of the member 33 will not be clamped securely between the inner side walls and the outer side walls.

When the strip 33 has been removed, the carton may be placed on a suitable support, usually in a microwave oven, and the frozen product may be heated in an extremely short period of time. In other words, the product may be served much in the same manner as a frozen sandwich or the like which is merely placed within the micro oven and heated. In view of the fact that many small restaurants and other eating places have micro ovens available, this is merely an added product which may be served. In view of the fact that the end wall panel 11 is surrounded by weakened lines of separation, this panel may be merely removed after the product has been heated to provide access to the carton contents.

FIGS. 8 through 14 of the drawings disclose a modified form of the construction. In this arrangement, the carton is substantially similar to that previously described, and is indicated in general by the letter C. The carton C includes a bottom panel 40 connected along a weakened line of separation 41 to an end wall panel 42. This in turn is connected along a weakened line of separation 43 to a top panel 44. The panels 40 and 44 are substantially indentical in size and shape and are triangular, the base edges of the triangle of each panel being secured to the end wall 42. Side walls 45 and 46 are hingedly connected to the edges of the bottom wall panel 40 along fold lines 47 and 49 respectively. A corner flap 50 is hingedly connected to an edge of the side wall panel 45 along a fold line 51 and is foldable inwardly of the side wall panel 46 when the carton is erected. A side wall panel which comprises an outer side wall is hingedly connected to the top panel 44 along a fold line 53, and a second side wall 54 is hingedly connected to the other converging edge of the top panel 44 along a fold line 55. The panels 52 and 54 are preferably somewhat wider than the panels 45 and 46, and accordingly extend below the level of the bottom panel 40 when the carton is erected.

Locking tabs 56 and 57 are connected to the ends of the end wall 42 along weakened lines of separation 59 and 60 respectively. The locking tabs 56 and 57 are designed to interlock into slots 61 and 62 in the side walls 45 and 46. Alternatively, the corner flaps 56 and 57 may be secured in any other suitable manner to the side walls 45 and 46.

A substantially semi-circular weakened line of separation 63 is provided in the center portion of the top wall 44, and communicates with weakened lines of separation 64 and 65 which extend across the end wall 42 in converging relation providing a removable area in the end wall. A strip of film such as plastic sheet film 66 is marginally secured to the bottom panel 40 and to the end wall 42. The corners of the rectangular sheet of film 66 normally extend into embossed areas 67 and 69 in the side walls 45 and 46 so that the corners of the film will not be clamped between the inner side walls 45 and 46 and the outer side walls 52 and 54 when the carton is erected. The film 66 is secured to the removable area 70 between the weakened lines of separation 64 and 65.

Figure 10:
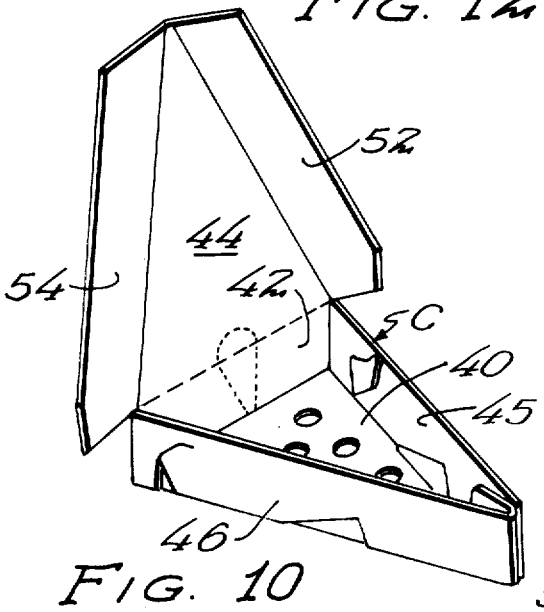
FIG. 10 is a perspective view of the carton before the contents have been inserted.
Figure 11:
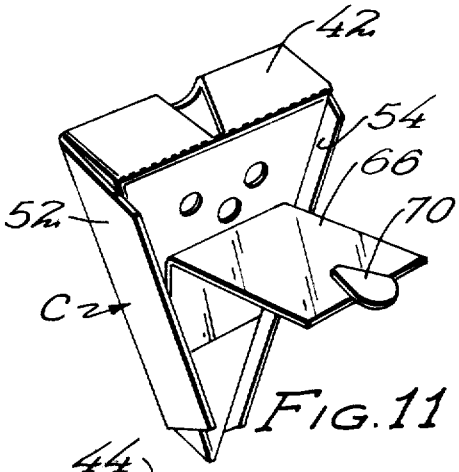
FIG. 11 is a perspective view of the carton shown in FIGS. 8 through 11 with the sealing strip partially removed.
Figure 13:
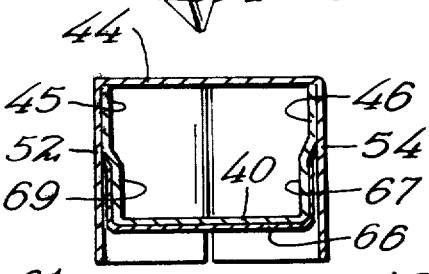
FIG. 13 is a sectional view through the carton, the position of the section being indicated by the line 13—13 of FIG. 9.
Figure 14:
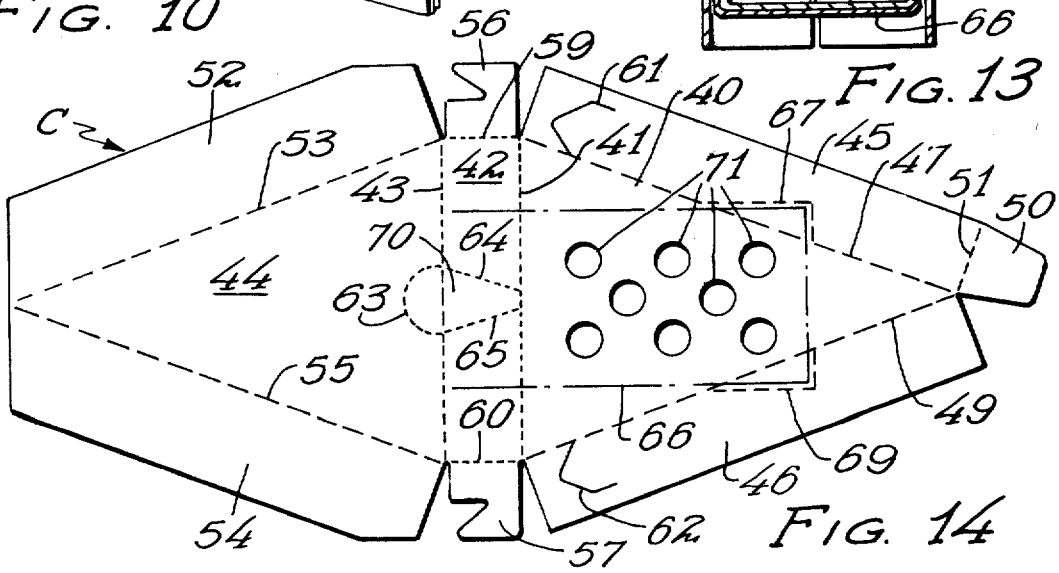
FIG. 14 is a diagrammatic view of the blank from which the carton shown in FIGS. 8 through 13 is formed.

The carton is set up much in the manner previously described. The side walls 45 and 46 are secured in right angular relation to the end wall 42 as indicated in FIG. 10 of the drawings. The contents are inserted into the carton while in the position indicated in FIG. 10, and the cover 44 is then folded downwardly, the side walls 52 and 54 being adhered or heat sealed to the side walls 45 and 46 to hold the carton closed.

When the carton and its contents are to be heated, the generally semi-circular portion within the weakened line of separation 63 is pressed downwardly, and the removable area 70 of the end wall is pulled outwardly, removing the film 66 from the end wall 42 and bottom wall 40. The removal of the film 66 exposes the apertures 71 in the bottom panel 40 and the carton is placed upon a flat surface in a heating chamber such as an oven in which the product is heated. The remaining portions of the end wall 42 are then removed by pulling them outwardly so that the contents may be slid from the carton and consumed.

In accordance with the Patents Statutes, I have described the principles of construction and operation of my improvement in Wedge Shaped Carton and while I have endeavored to set forth the best embodiment thereof, I desire to have it understood that obvious changes may be made within the scope of the following claims without departing from the spirit of my invention.

I claim:

[1. A generally triangular carton for use in containing a wedge-shaped piece of pizza or the like including:

a generally triangular bottom panel having a base edge and converging side edges, a generally rectangular end wall hingedly connected to the base edge of said bottom panel and extending upwardly therefrom, a generally triangular top panel hingedly connected to the upper edge of said end wall, said top panel being substantially identical in size and shape to said bottom panel, and extending parallel to said bottom panel, inner side wall panels secured to the converging edges of said bottom panel and extending upwardly therefrom, outer side wall panels secured to the converging edges of said top panel and extending downwardly therefrom outwardly of said inner side wall panels, means securing said inner and outer side wall panels in face contact, corner flaps connecting the converging ends of side walls, and connecting the ends of said end wall to said side walls, said bottom panel having a series of spaced apertures therethrough, a strip of film secured to the under surface of said bottom panel and upwardly along said end wall panel, said strip closing said apertures, the strip of film being secured in a manner to be readily detachable to expose said apertures.]

[2. The structure of claim 1 and in which said outer side walls extend below the plane of said bottom panel to support said bottom panel in spaced relation to a surface upon which said carton is placed.]

[3. The structure of claim 1 and in which said end wall is defined by weakened lines of contact.]

[4. The structure of claim 1 and in which said end of said strip of film extends beyond the surface of said top panel.]

[5. The structure of claim 1 and in which said top panel includes a detachable area adjoining said base edge thereof, and including a pair of weakened lines of separation extending downwardly from the edges of said detachable area between which said film strip is secured.]

[6. A carton including:

a bottom panel, first side walls hinged to the edges of said bottom panel and extending upwardly therefrom, a top panel hingedly secured along one edge to one of said side walls and extending substantially parallel to said bottom panel, said top panel being substantially identical in size and shape to said bottom panel, second side walls hingedly secured to the remaining edges of said top panel and extending downwardly therefrom and secured in face contact with said first side walls, said bottom panel having a series of spaced apertures extending therethrough, a strip of film secured to the under surface of said bottom panel and extending upwardly outwardly of one of said side walls, said film closing said aperture and being secured in a manner to be readily detachable to expose said apertures.]

[7. The structure of claim 6 and in which said second side walls lie outwardly of said first side walls and extend below the plane of said bottom panel to support said bottom panel in spaced relation to a surface upon which said carton is placed.]

[8. The structure of claim 6 and in which said one side wall is defined by weakened lines of separation.]

[9. The structure of claim 6 and in which an end of said film extends above the surface of said top panel.]

[10. The structure of claim 6 and in which said top panel includes a detachable area adjoining said one side wall, and including a pair of weakened lines of separation extending downwardly from the edges of said detachable area in said one side wall between which said film strip is secured.]

*11. A generally triangular carton for use in containing a wedge-shaped piece of pizza or the like including:*

*a generally triangular bottom panel having a base edge and converging side edges,*

*a generally rectangular end wall hingedly connected to the base edge of said bottom panel and extending upwardly therefrom,*

*a generally triangular top panel hingedly connected to the upper edge of said end wall, said top panel being substantially identical in size and shape to said bottom panel, and extending parallel to said bottom panel,*

*inner side wall panels secured to the converging edges of said bottom panel and extending upwardly therefrom,*

*outer side wall panels secured to the converging edges of said top panel and extending downwardly therefrom outwardly of said inner side wall panels,*

*means securing said inner and outer side wall panels in face contact,*

*corner flaps connecting the converging ends of side walls, and connecting the ends of said end wall to said side walls,*

*said bottom panel having a series of spaced apertures therethrough,*

*a strip of film secured to the under surface of said bottom panel,*

*the strip of film being secured in a manner to be readily detachable to expose said apertures.*

*12. The structure of claim 11 and in which said outer side walls extend below the plane of said bottom panel to support said bottom panel in spaced relation to a surface upon which said carton is placed.*

*13. The structure of claim 11 and in which said end wall is defined by weakened lines of contact.*

*14. The structure of claim 11, wherein said strip of film extends upwardly along said end wall panel, said strip closing said apertures.*

*15. The structure of claim 14 and in which said end of said strip of film extends beyond the surface of said top panel.*

*16. The structure of claim 14 and in which said top panel includes a detachable area adjoining said base edge thereof, and including a pair of weakened lines of separation extending downwardly from the edges of said detachable area between which said film strip is secured.*

*17. A carton including:*

*a bottom panel,*

*first side walls hinged to the edges of said bottom panel and extending upwardly therefrom,*

*a top panel hingedly secured along one edge to one of said side walls and extending substantially parallel to said bottom panel, said top panel being substantially identical in size and shape to said bottom panel,*

*second side walls hingedly secured to the remaining edges of said top panel and extending downwardly therefrom and secured in face contact with said first side walls,*

*said bottom panel having a series of spaced apertures extending therethrough,*

*a strip of film secured to the under surface of said bottom panel,*

*said film closing said aperture and being secured in a manner to be readily detachable to expose said apertures.*

*18. The structure of claim 17 and in which said second side walls lie outwardly of said first side walls and extend below the plane of said bottom panel to support said bottom panel in spaced relation to a surface upon which said carton is placed.*

*19. The structure of claim 17 and in which said one side wall is defined by weakened lines of separation.*

*20. The structure of claim 17, wherein said strip of film extends upwardly outwardly of one of said side walls.*

*21. The structure of claim 20 and in which an end of said film extends above the surface of said top panel.*

*22. The structure of claim 20 and in which said top panel includes a detachable area adjoining said one side wall, and including a pair of weakened lines of separation extending downwardly from the edges of said detachable area in said one side wall between which said film strip is secured.*

* * * * *